United States Patent Office 3,702,861
Patented Nov. 14, 1972

---

3,702,861
PREPARATION OF N-ALKYL ANILINO-METHYLENEMALONONITRILES
Robert K. Howe, Bridgeton, Mo., assignor to Monsanto Company, St. Louis, Mo.
No Drawing. Continuation-in-part of application Ser. No. 681,578, Nov. 8, 1967. This application Aug. 3, 1970, Ser. No. 60,720
Int. Cl. C07c *121/78*
U.S. Cl. 260—465 E                                    10 Claims

ABSTRACT OF THE DISCLOSURE

Preparation of N-alkyl derivatives of anilinomethylenemalononitriles by reacting an anilinomethylenemalononitriles with a dialkyl sulfate.

---

This application is a continuation-in-part of copending application Ser. No. 681,578, filed Nov. 8, 1967, U.S. Pat. No. 3,551,573, by Robert K. Howe and Joseph W. Baker.

This invention relates to N-alkyl anilinomethylenemalononitriles and particularly to new and useful methods of preparing them.

It has been found in accordance with the present invention that N-alkyl derivatives of anilinomethylenemalononitriles can be conveniently prepared by reacting an anilinomethylenemalononitrile with a dialkyl sulfate. This method of preparation is advantageous for all N-alkyl derivatives of anilinomethylenemalononitriles and is required when, due to the nature of the alkyl group, the N-alkyl derivative cannot be prepared directly. N-alkyl compounds in which the alkyl group has a maximum of 8 carbon atoms can be prepared by this method.

The reaction on which the method of this invention is predicated can be represented by the following equation

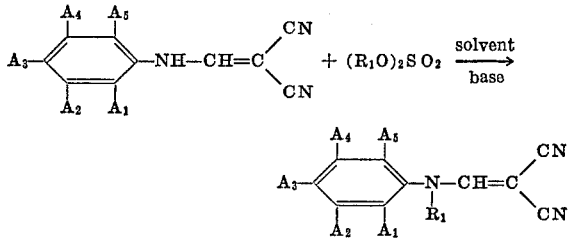

wherein $R_1$ is alkyl having a maximum of 8 carbon atoms; $A_1$, $A_2$, $A_3$, $A_4$ and $A_5$ are independently selected from the group consisting of hydrogen, alkyl having a maximum of 8 carbon atoms, chlorine, bromine, fluorine, iodine, nitro, cyano, alkoxy having a maximum of 5 carbon atoms, phenyl and substituted phenyl in which the substituents are the groups defined by $A_1$, $A_2$, $A_3$, $A_4$ and $A_5$, trichloromethyl, trifluoromethyl, carboalkoxy having a maximum of 8 carbon atoms,

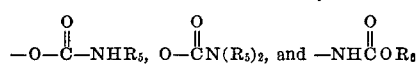

wherein $R_5$ and $R_6$ are alkyl groups having a maximum of 5 carbon atoms; provided that when $A_1$, $A_2$, $A_3$, $A_4$ or $A_5$ are alkyl-branched on the alpha carbons, trichloromethyl, phenyl or substituted phenyl they are on other than adjacent carbons and there are a maximum of 3 such substituents, the remaining groups being hydrogen; further provided that when $A_1$, $A_2$, $A_3$, $A_4$ or $A_5$ are

there is only one such substituent, the remaining groups being hydrogen.

In the above formulae the alkyl substituents can be methyl, ethyl, n-propyl, isopropyl, n-butyl, secondary butyl, tertiary butyl and the various forms of pentyl, hexyl, heptyl and octyl. The alkoxy substituents can be the corresponding alkoxy groups having a maximum of 5 carbon atoms.

The alkylation reaction is usually run in an inert solvent such as acetone, tetrahydrofuran, dioxane, benzene, toluene, xylene or the like. The components are mixed in the solvent and a base, such as potassium or sodium carbonate, is added. The product is separated from the reaction mixture by conventional methods. In this procedure the reaction temperature can be in the approximate range of 20–150° C. The reaction is preferably conducted under reflux conditions under atmospheric pressure, but can be conducted under super-atmospheric pressures at temperatures above the boiling point of the solvent. The base and dialkylsulfate are present in either approximately equal mole proportions or in excess of the mole quantity of the anilinomethylenemalononitriles.

The invention and the various ramifications thereof will be more readily understood by reference to the following examples. In these examples and throughout the specification all proportions are expressed in parts by weight unless otherwise designated.

EXAMPLE 1

2 - chloro - 5 - trifluoromethylanilinomethylenemalononitrile.

To a suitable vessel equipped with an agitator, reflux condenser and thermometer was charged 19.6 parts of 3-amino-4-chlorobenzotrifluoride and 12.2 parts of ethoxymethylenemalononitrile in 125 parts ethanol and the mixture refluxed for 48 hours. The solution was then cooled, precipitating the product. The product was collected and washed with ethanol. Recrystallization from ethanol gave the product having a melting point of 177–179° C. via 70% yield.

*Analysis.*—Calculated for $C_{11}H_5Cl_1F_3N_3$ (percent): C, 48.64; H, 1.86. Found (percent): C, 48.86; H, 2.00.

EXAMPLE 2

3,5 - ditrifluoromethyl - N - ethylanilinomethylenemalononitrile.

To a suitable vessel, equipped with an agitator, reflux condenser, and thermometer, was charged 15.26 parts 3,5-di - tri - fluoromethylanilinomethylenemalononitrile, prepared by the procedure given in Example 1, 13.82 parts potassium carbonate, 8.14 parts diethyl sulfate and 150 parts tetrahydrofuran. The resultant mixture was refluxed for 22 hours. Water was then added to the mixture and the resultant mixture extracted with ether. Concentration of the ether solution yielded an oil residue which solidified upon the addition of hexane. The solid was collected and recrystallzed from a methanol-water mixture to yield 3,5-di-trifluoromethyl - N - ethylanilinomethylenemalononitrile melting at 118–120° C.

*Analysis.*—Calculated for $C_{14}H_9F_6N_3$ (percent): C, 50.46; H, 2.72. Found (percent): C, 50.59; H, 2.78.

EXAMPLE 3

3-trifluoromethyl-4-chloro - N - methylanilinomethylenemalononitrile is as follows:

To a suitable vessel, equipped with an agitator, thermometer and reflux condenser, was charged 2.68 parts 3 - trifluoromethyl - 3 - trifluoromethyl - 4 - chloroanilinomethylenemalononitrile, 2.76 parts potassium carbonate, 2.52 parts dimethylsulfate and 30 parts acetone. The mixture was stirred at room temperature for about 40 minutes and then poured into 300 ml. water. Additional potassium carbonate was added and the mixture extracted with two 150 ml. portions of diethyl ether. The combined ether portions were extracted with sodium chloride solution and dried over sodium sulfate. The solution was concentrated yielding an oil residue which solidified. The solid was recrystallized from ethanol-water. Melting point of the solid 93–95° C.

*Analysis.*—Calculated for $C_{12}H_7ClF_3N_3$ (percent): C, 50.45; H, 2.47. Found (percent): C, 50.19; H, 2.46.

Other anilinomethylenemalononitriles compounds which can be prepared by the above procedures and their physical properties are as follows:

| Compound | $R_1$ | $A_1$ | $A_2$ | $A_3$ | $A_4$ | $A_5$ | M.P. (° C.) |
|---|---|---|---|---|---|---|---|
| 1 | $CH_3$ | H | H | H | H | H | 115–117 |
| 2 | $C_2H_5$ | H | H | $COOC_2H_5$ | H | H | 126–128 |
| 3 | $CH_3$ | H | H | $COOC_2H_5$ | H | H | 169–170 |
| 4 | $CH_3$ | H | $CH_3$ | H | H | H | 101–103 |
| 5 | $C_2H_5$ | H | $CH_3$ | H | H | H | 39–40 |
| 6 | $n\text{-}C_8H_{17}$ | H | Cl | Cl | H | H | Oil |
| 7 | $CH_3$ | H | $CF_3$ | Cl | H | H | 93–95 |
| 8 | $CH_3$ | H | $CF_3$ | H | $CF_3$ | H | 140–142 |
| 9 | $CH_3$ | H | $CF_3$ | H | H | Cl | 106.5–108 |
| 10 | $C_2H_5$ | H | Cl | Cl | H | H | 89–90 |
| 11 | $CH_3$ | Cl | H | Cl | H | H | 127–128 |
| 12 | $C_2H_5$ | Cl | H | Cl | H | H | 110–111 |
| 13 | $CH_3$ | H | Cl | Cl | H | H | 159–162 |
| 14 | $CH_3$ | Cl | Cl | H | H | H | 140–142 |
| 15 | $CH_3$ | Cl | H | H | Cl | H | 107–111 |
| 16 | $C_2H_5$ | Cl | Cl | H | H | H | 77–78 |
| 17 | $C_2H_5$ | Cl | H | H | Cl | H | 49–55 |
| 18 | $C_2H_5$ | H | $CF_3$ | H | $CF_3$ | H | 118–120 |
| 19 | $CH_3$ | H | Cl | $CH_3$ | H | H | 142–144 |
| 20 | $C_2H_5$ | H | Cl | $CH_3$ | H | H | 99–102 |
| 21 | $C_2H_5$ | H | $CF_3$ | Cl | H | H | 68–75 |
| 22 | $CH_3$ | H | Cl | H | Cl | H | 88.5–90 |
| 23 | $CH_3$ | H | Cl | H | Cl | H | 145–146.5 |

A small number of the compounds prepared in accordance with the method of this invention are known in the art as ultraviolet absorbers and as potential muscle relaxants. As disclosed in copending application, Ser. No. 681,578, of Robert K. Howe and Joseph W. Baker, many of these N-alkyl anilinomethylenemalononitriles have valuable insecticidal activity. For example, N-methyl-3-trifluoromethyl-4-chloroanilinomethylenemalononitrile (identified as compound No. 7 in the above table) and N-ethyl-3,5-ditrifluoromethylanilinomethylenemalononitrile (identified as compound No. 18) both provided 100% kills of southern army-worms when applied to the pests at a concentration of only 0.005%.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which resides in the present invention including all features which would be treated as equivalents thereof by those skilled in the art to which the invention pertains.

What is claimed is:

1. A method for the preparation of N-alkyl anilinomethylenemalononitriles of the formula

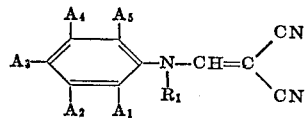

which comprises mixing an anilinomethylenemalononitrile of the formula

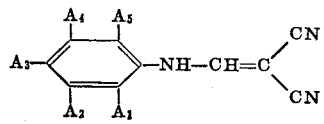

with a dialkyl sulfate of the formula $$(R_1O)_2SO_2$$

in the presence of an inert solvent and a base wherein $R_1$ is alkyl having a maximum of 8 carbon atoms; $A_1$, $A_2$, $A_3$, $A_4$ and $A_5$ are independently selected from the group consisting of hydrogen, alkyl having a maximum of 8 carbon atoms, chlorine, bromine, fluorine, iodine, nitro, cyano, alkoxy having a maximum of 5 carbon atoms, phenyl and substituted phenyl in which the substituents are the groups defined by $A_1$, $A_2$, $A_3$, $A_4$ and $A_5$, trichloromethyl, trifluoromethyl, carboalkoxy having a maximum of 8 carbon atoms

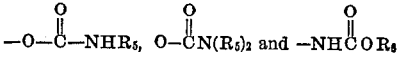

wherein $R_5$ and $R_6$ are alkyl groups having a maximum of 5 carbon atoms; provided that when $A_1$, $A_2$, $A_3$, $A_4$ or $A_5$ are alkyl-branched on the alpha carbons, trichloromethyl, phenyl or substituted phenyl they are on other than adjacent carbons and there are a maximum of 3 such substituents, the remaining groups being hydrogen; further provided that when $A_1$, $A_2$, $A_3$, $A_4$ or $A_5$ are

there is only one such substituent, the remaining groups being hydrogen.

2. A method in accordance with claim 1 in which the anilinomethylenemalononitrile is mixed with the dialkyl sulfate at a temperature between about 20° C. and about 150° C.

3. A method in accordance with claim 1 in which at least one of $A_1$, $A_2$, $A_3$, $A_4$ or $A_5$ is trifluoromethyl or halogen.

4. A method in accordance with claim 1 in which at least one of $A_1$, $A_2$, $A_3$, $A_4$ or $A_5$ is trifluoromethyl and $R_1$ is methyl or ethyl.

5. A method in accordance with claim 1 in which at least one of $A_1$, $A_2$, $A_3$, $A_4$ or $A_5$ is halogen and $R_1$ is methyl or ethyl.

6. A method in accordance with claim 1 in which $A_1$, $A_3$ and $A_5$ are hydrogen; $A_2$ and $A_4$ are trifluoromethyl and $R_1$ is ethyl.

7. A method in accordance with claim 1 in which $A_1$, $A_3$ and $A_5$ are hydrogen; $A_2$ and $A_4$ are trifluoromethyl and $R_1$ is methyl.

8. A method in accordance with claim 1 in which $A_1$, $A_4$ and $A_5$ are hydrogen; $A_2$ is trifluoromethyl; $A_3$ is chlorine and $R_1$ is ethyl.

9. A method in accordance with claim 1 in which $A_1$, $A_4$ and $A_5$ are hydrogen; $A_2$ is trifluoromethyl; $A_3$ is chlorine and $R_1$ is methyl.

10. A method in accordance with claim 1 in which $A_2$, $A_4$ and $A_5$ are hydrogen; $A_1$ and $A_3$ are chlorine and $R_1$ is methyl.

References Cited

UNITED STATES PATENTS 3,079,366   2/1963   Boyle et al. _____ 260—465 X

OTHER REFERENCES

Fieser & Fieser: Reagents for Organic Synthesis, pp. 293–6, John Wiley and Sons, Inc. (1967).

Gilman et al.: J. Am. Chem. Soc., vol. 62, pp. 344–5 (1940).

LEWIS GOTTS, Primary Examiner

D. A. TORRENCE, Assistant Examiner

U.S. Cl. X.R.

252—300; 260—465 D, 999